Sept. 6, 1949.  J. E. GREENAWALT  2,481,110
DEWATERING PROCESS
Filed July 31, 1945    3 Sheets-Sheet 2

Inventor:
John E. Greenawalt.
By George D. Haight
Atty.

Sept. 6, 1949. J. E. GREENAWALT 2,481,110
DEWATERING PROCESS
Filed July 31, 1945 3 Sheets-Sheet 3

Inventor:
John E. Greenawalt.

Patented Sept. 6, 1949

2,481,110

UNITED STATES PATENT OFFICE 2,481,110

DEWATERING PROCESS

John E. Greenawalt, Bronxville, N. Y., assignor to General American Transportation Corporation, Chicago, Ill., a corporation of New York Application July 31, 1945, Serial No. 607,935

5 Claims. (Cl. 34—14)

In the reclamation of ores by what is known as the ore wet concentration process, the practice universally employed in industry comprises finely crushing the ore with a large stream or volume of water in a rod mill from which it is discharged in a continuous stream of treated ore or pulp containing 60% or more of water which consists of fine ore particles all of which will pass through a 20 mesh screen and of finer particles much of which is in the form of slimes. With the water content of the treated pulp up to 60% or more, it becomes sufficiently watery to flow and distribute itself uniformly into the hoppers of a slowly rotating vacuum drum filter which operates quickly to remove the excess water, then slowly to remove the residual water and finally to discharge a filter cake normally containing 6% or less of water.

The present invention relates to an improvement in the method of distributing the pulp stream uniformly over the filter medium after the excess water has been removed from the pulp stream, so that it contains only 15% to 18% water, as it is deposited upon the filter medium.

The principal object of the present invention is to provide a novel method of distributing the ore over the filter medium which increases the useful capacity of the filter medium as much as 500% or more.

Another object of the invention is to improve said method and means, so that the amount of water handled by the filter medium is substantially decreased and the amount of solids handled thereby is substantially increased and the passage of fines into or through the pores of the filter medium is substantially reduced, thereby maintaining a higher filter efficiency and a longer filtering life while producing a filter cake containing a substantially higher percentage of fines.

I have attained the foregoing objectives by reducing the amount of water to the point where the pulp is much less fluid and by feeding the non-fluid pulp directly to and mechanically distributing it uniformly over the filter medium. With this method, the amount of water passed through the filter is decreased substantially, the amount of solids handled by the filter is correspondingly increased, and the amount of fines passing through the filter medium is substantially decreased resulting in a substantial increase in the fines content of the discharged cake and a substantial decrease in the fines both contained in the filtrate and adhering to the filter medium after the cake is discharged. The decrease in the passage of fines through the filter medium and the adherence of fines to the filter medium not only increase the efficiency of the structure but serve to lengthen the useful life of the filter medium while maintaining an enhanced operating efficiency. An additional advantage of this invention is that the good operating characteristics of the filter are maintained during substantial variations in the thickness of the filter cake occasioned by the normally encountered variations in the feeding rate.

The invention is explained in the following description in connection with the accompanying drawings which illustrate one embodiment of the invention.

Figure 1:
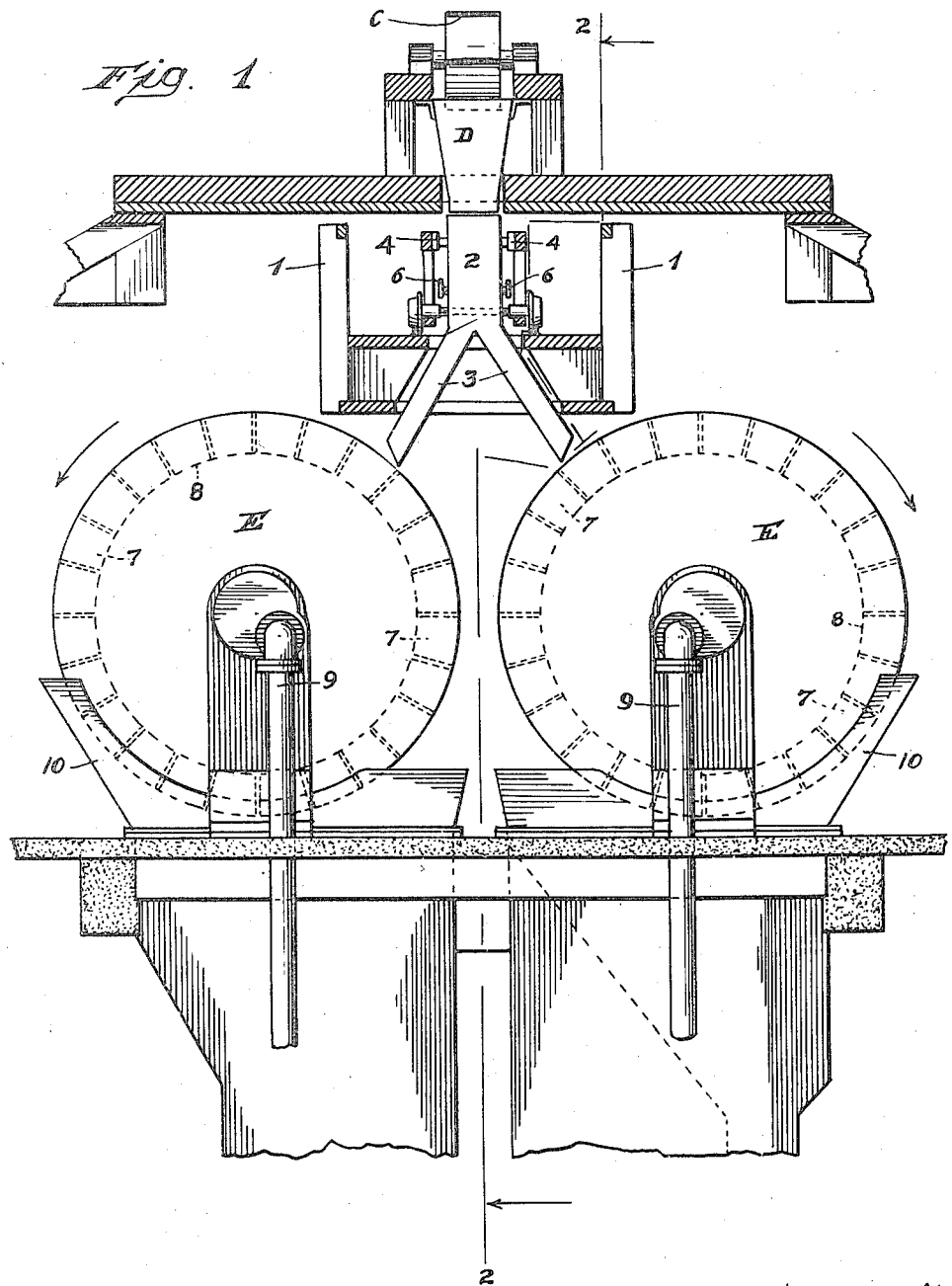
Fig. 1 is a view in elevation of the oscillating spouts which are arranged to direct the pulp and distribute it on the filter medium of a pair of rotary vacuum drum filters.
Figure 2:
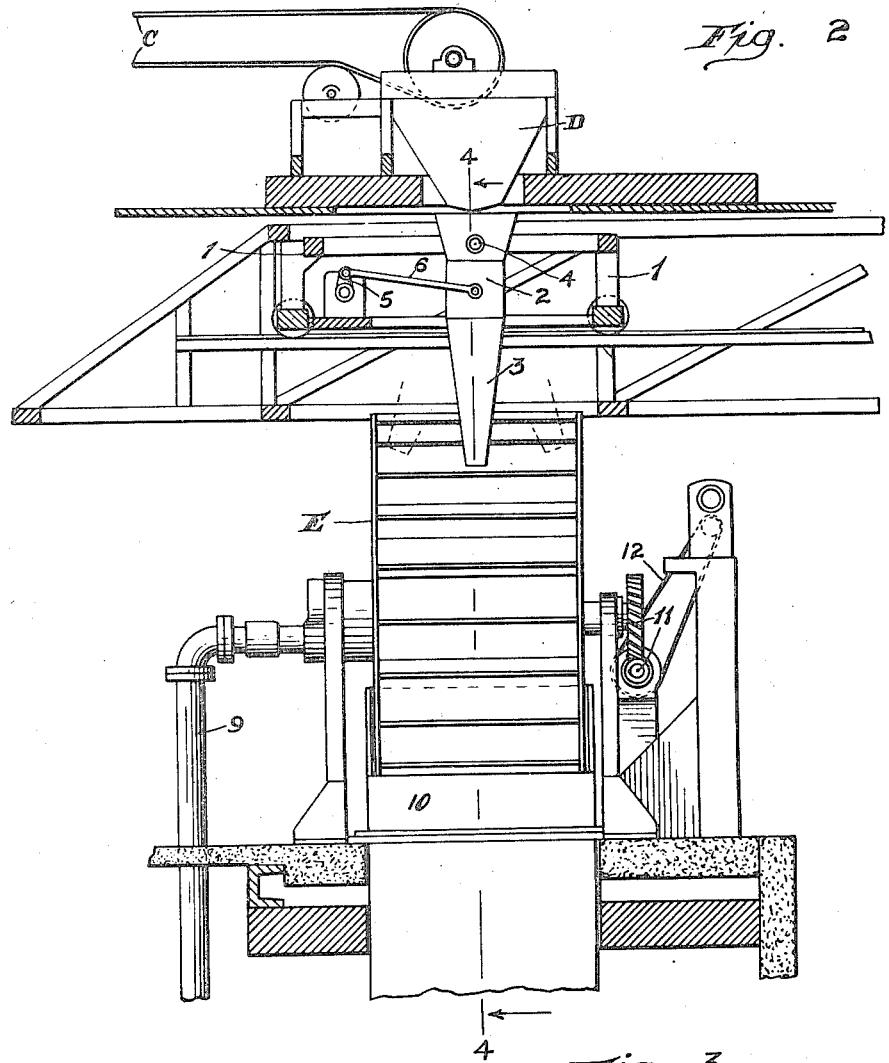
Fig. 2 is a vertical sectional view of the structure of Fig. 1, the view being taken substantially on the line 2—2 of Fig. 1.
Figure 3:
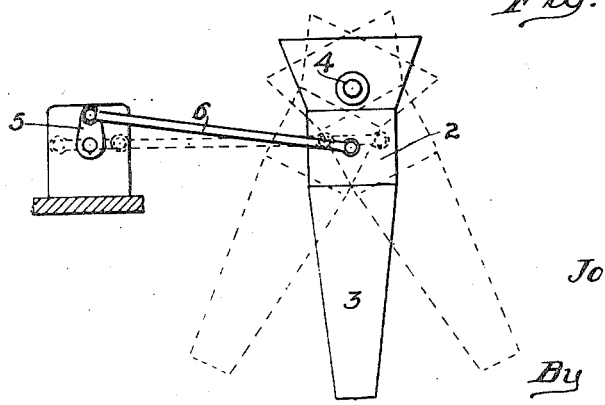
Fig. 3 is a detail view in elevation of the oscillating distributing spout illustrating the range of movement of the spout and the mechanism for actuating said spout.
Figure 4:
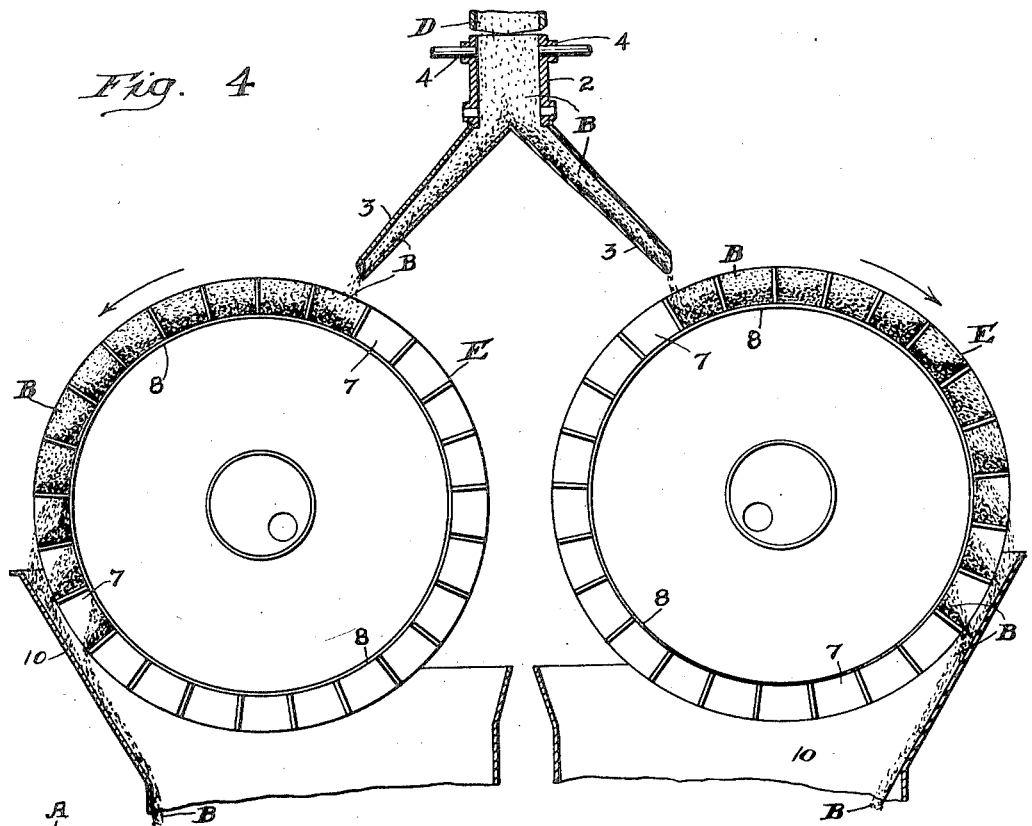
Figure 5:
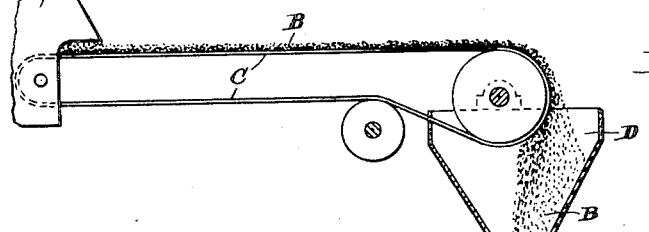

Fig. 4 is a skeleton section of the spout and drum filters taken on the line 4—4 of Fig. 2 to better illustrate the feeding of the pulp to the filter drums and the distribution of the pulp thereon; and Fig. 5 is a diagrammatic view illustrating the carrying out of the process of handling the pulp by conveying the non-fluid pulp to, and discharging it into, the distributing spout and depositing uniform layers of the pulp on the filter drums.

The invention is described herein in connection with the ore wet concentration process in which the iron concentrate is de-watered to prepare it for a sintering process, but it is to be understood that the process and mechanism of this invention is adapted to the treatment of other materials such as wet fine coal which it is desired to de-water.

The ore as mined is crushed through a 20 mesh screen and the iron particles are separated from the gangue by the magnetic concentration process. In crushing and handling the ore a large volume of water, amounting to as much as 60% or more, is used as a vehicle to carry along the heavy mineral particles and distribute it uniformly on the surface of the filter where all of this water passes through the filter.

In accordance with this invention, the use of this great excess of water as a vehicle or means of carrying the mineral to the filter medium is dispensed with and hence is not passed through the filter. Instead, the pulp is reduced to a water content of preferably 15% to 18%, and in this condition is mechanically handled by means of an oscillating distributor which deposits the pulp over the entire filter medium of the rotary drum filter. The preparation of the pulp to place it in condition for mechanical distribution by the removal of the excess water to the extent of reducing its water content to 15% to 18% may be accomplished in any well known manner at any stage in the handling of the material prior to delivery to the distributing mechanism. For example, the excess water may be removed in the concentrating plant and the pulp deposited on a belt conveyor and carried thereby to the distributing mechanism. This is illustrated in Fig. 5 in which the discharge outlet A in the concentrating plant deposits the pulp B upon the conveyor C, and the conveyor is arranged to discharge the pulp into the funnel D of the distributing mechanism by which it is directed onto the filter surfaces of the rotating drum filters E.

In the present structure, two rotary drum filters are illustrated with a common oscillating spout serving both of these filters, but it is obvious, of course, that a single spout individual to each drum may be used if desired.

The spout mechanism is positioned above the drums and is mounted upon the suitable frame 1. The conveyor C which brings the pulp or slurry to the distributing mechanism in a steady or constant stream, is positioned above the funnel D with its end overhanging the funnel so that the material drops from the conveyor and is guided by the funnel into the common chute 2 of the spout mechanism. This chute has two branches which form spouts 3 which are angularly directed toward the peripheries of the drum filters. The lower ends of these spouts are close to the peripheries of the drums so as to direct the material onto the surface of the drums. The upper end of the common chute is mounted in trunnion bearings 4 to swing or oscillate about an axis transverse to the axis of rotation of the drums. The spout may be oscillated by any suitable mechanism. In the present structure, motor driven cranks 5 are connected by the links 6 to the chute 2 below the trunnions so that rotation of the cranks swing the spout about its trunnion bearings.

The range of oscillation of the spouts is indicated in dotted lines in the drawing, and this range is sufficient so that the discharge ends of the spouts sweep the entire width of the drums which in practice is six feet or more. Thus the pulp flowing down the spouts is delivered upon the drum filters in a constant stream and is distributed uniformly throughout the width of the drum filters. The thickness of the cake which is deposited on the drums can be determined by regulating the speed of rotation of the drum in relation to the oscillation of the spouts.

The rotary vacuum drum filters E may be of any suitable type for the purpose. Those illustrated in the drawings are of a well-known type having a series of pockets or cells 7 and a continuous pervious filter medium 8 extending the width of the drum and through which the water is drawn by vacuum from the cake or layers of material which are deposited in the pockets or cells as the drums rotate. These filters are arranged to establish a vacuum within the interior of the drum and with suitable pipe connections 9 for carrying off the water which is removed from the pulp.

The material which is deposited upon the filter medium of the drums is carried around by the rotation of the drums until it reaches a point below the axis of the drums where it is discharged from the drums by dropping into the hoppers 10, from whence it is delivered to a conveyor or other suitable means to be carried away to the sintering process. During the rotation of the drums, the water content of the cake of material or pulp is drawn or sucked through the filtering medium by virtue of the vacuum established within the drum, until by the time the cake reaches the discharge point the pulp is de-watered to the extent that there remains only 6% or less of water content. It is the usual practice in this type of filter to cut off the vacuum at the discharge point of the cake and blow air outwardly through the filter medium to facilitate the dislodgment of the cake and to clean the filter medium, this control of the vacuum and air being accomplished by suitable valves operated by the rotation of the drum. The rotation of the filter drum at the desired speed may be accomplished in any suitable manner well known in the art. In the drawings, the driving mechanism is shown as a worm and worm wheel train 11, associated with the shaft of the drum and driven by the motor driven belt 12.

This improved method of handling the pulp in the filtering process has actually increased the capacity of the filter as much as 500% and has enabled the plant to handle and de-water as much as five times the tonnage of pulp over the generally used method of employing a large volume of water as a vehicle to carry the pulp to and deposit it upon the filter medium. These results are due to the fact that the pulp is delivered to the filter in a very much less fluid condition and is actually deposited upon the filter medium in a stream which is moved mechanically, rather than by the flow of a large volume of water. A much greater volume of solids can thus be deposited upon the filter medium since the pulp is not diluted with a large volume of water which would otherwise have to be passed through the filter. In addition to this, the body of pulp of relatively low water content flows constantly in a stream which is maintained in motion across the entire width of the filter surface thereby bringing about a uniform distribution of the pulp over the entire filter surface. The result is that a much thicker layer or cake is deposited on the filter medium, which thickness is controlled by properly relating the speed of rotation of the drum and the rate of oscillation of the spout.

The efficiency of the filter medium is further increased by the use of pulp of relatively low water content. As the pulp flows down the inclined spout, the heavier and coarser particles flow on the bottom of this spout and the water and slimy material flow on top; so that as the filter drum rotates, the coarser material is first deposited on the filter medium and the opening or pores of the filter medium are covered with the coarser material. In other words, as the pulp flows down the spout, there is a certain amount of segregation which occurs wherein the coarse, heavy material slides in the bottom of the spout and the lighter material, such as the sludge, is suspended in the water and flows in the upper part of the spout. The coarser particles drop onto the filter medium first and provide a coating or layer which prevents to a great extent the washing of the fine slimes into and clogging the openings or pores of the filter medium. The filtering capacity of the filter medium is thus greatly increased, the tendency to clog the filtering medium is greatly decreased, and the filtering is more effectively cleaned when the cake is discharged.

I claim:

1. The process of vacuum filtering crushed ore materials crushed to varying degrees of fineness in the presence of water to form a fluid pulp in which the ore particles will pass a 20 mesh screen and the water content exceeds 60%, which consists in the step of removing water from said fluid pulp in a concentrating plant to form a non-fluid pulp, namely, one containing less than 18% water, followed by the step of mechanically conveying (as distinguished from hydraulically conveying) said non-fluid pulp in a continuous stream to a rotary vacuum filter and then subjecting the non-fluid pulp to a vacuum filtering treatment to remove remaining water content by directing a single stream of the non-fluid pulp upon the surface of the filtering medium of the rotary vacuum filter and bodily moving said stream to distribute the non-fluid pulp uniformly over the entire width of the surface of the filter medium and applying a vacuum to the non-fluid pulp until its water content is reduced to below 6% thereby to form a de-watered crushed ore filter cake.

2. The process of vacuum drying crushed ore materials crushed to varying degrees of fineness in the presence of water to form a fluid pulp in which the ore particles are of sufficient fineness to pass a 20 mesh screen and the water content exceeds 60%, which consists in removing water from said fluid pulp until its water content is from 15% to 18% water thereby producing a non-fluid pulp, then mechanically conveying (as distinguished from conveying hydraulically) the non-fluid pulp to a rotary vacuum filter having a filter medium rotating with said filter and then subjecting said non-fluid pulp to a vacuum filtering treatment to remove remaining water content of said non-fluid pulp by directing a single stream of said non-fluid pulp upon the surface of the moving filter medium of said rotary vacuum filter and bodily moving the stream of non-fluid pulp transversely to the direction of movement of the filter medium to evenly distribute the non-fluid material over the entire width of the surface of the filter medium and then continuing the vacuum treatment until the water content of said crushed ore pulp is decreased to below 6% to form filter cake, and finally discharging the filter cake so formed from the filter.

3. The process of vacuum drying ore materials crushed to varying degrees of fineness in the presence of water to form a fluid pulp in which the ore particles will pass a 20 mesh screen and the water content exceeds 60%, which consists in the step of removing water from said fluid pulp to reduce the water content to 15% to 18% thereby producing a non-fluid pulp, then, as a second step, mechanically conveying (as distinguished from hydraulically conveying) said non-fluid pulp to a rotary vacuum filter having a filter medium rotating with said filter and then subjecting the non-fluid pulp to a vacuum filtering treatment to remove remaining water content of said non-fluid pulp by directing a single stream of the non-fluid pulp upon the surface of the rotating drum filter medium and bodily oscillating said stream of non-fluid pulp in a direction transversely to the direction of rotation of said filter to distribute the non-fluid pulp over a width of drum surface greater than the width of the stream and continuing the vacuum treatment until the pulp is freed of water to a point where the water content is less than 6% to form a substantially dry filter cake.

4. The process of drying a fluid pulp consisting of iron ore concentrate crushed to fine particles which are of sufficient fineness to pass a 20 mesh screen and mixed with a relatively large volume of water, namely, more than 60%, which mixture of water and iron ore particles forms said fluid pulp, which process consists in the step of removing water from said fluid pulp in a concentrating plant to produce a non-fluid pulp containing less than 18% water and, as a second step, mechanically conveying (as distinguished from hydraulically conveying) said non-fluid pulp in a continuous stream to a rotary vacuum drum filter, and then, as a third step, subjecting the non-fluid pulp to a vacuum filtering treatment to further reduce the water content by depositing a relatively constant single stream of the non-fluid pulp upon the filter medium of said rotary vacuum drum filter and bodily and mechanically oscillating the said stream of non-fluid pulp to distribute and evenly deposit said non-fluid pulp over the entire width of the surface of the filter medium and then applying vacuum to said deposited non-fluid pulp until its water content is reduced to below 6% to form a substantially dry filter cake of said iron ore concentrate.

5. The process of de-watering iron concentrate crushed to fine particles which are of sufficient fineness to pass a 20 mesh screen and mixed with a relatively large volume of water, namely, more than 60%, which mixture of iron concentrate particles and water forms a fluid pulp, which process consists in the step of removing water from said fluid pulp in a concentrating plant to produce a non-fluid pulp containing 15% to 18% water and, as a second step, mechanically conveying (as distinguished from hydraulically conveying) said non-fluid pulp in a continuous stream to a rotating drum vacuum drier having a filter medium of greater width than said stream, and then, as a third step, subjecting the said non-fluid pulp to a vacuum filtering treatment to further reduce the water content by depositing a narrow stream of the said non-fluid pulp upon the surface of the relatively wider filter medium of said rotating drum vacuum filter and bodily and mechanically moving said stream across substantially the entire width of said filter medium while the drum is rotated to distribute the pulp evenly throughout the width of said filter medium and then applying vacuum to the thus deposited non-fluid pulp to reduce the water content of said pulp to below 6%, thereby producing a substantially dry filter cake of said iron concentrate.

JOHN E. GREENAWALT.

REFERENCES CITED

The following references are of record in the file of this patent:

UNITED STATES PATENTS

| Number | Name | Date |
|---|---|---|
| Re. 18,598 | Schimmin | Sept. 13, 1932 |
| 1,056,738 | Catlett et al. | Mar. 18, 1913 |
| 1,163,828 | Koering | Dec. 14, 1915 |
| 1,198,880 | Wagner | Sept. 19, 1916 |
| 1,367,946 | Carrick | Feb. 8, 1921 |
| 1,449,774 | Najarian | Mar. 27, 1923 |
| 1,752,758 | Schimmin | Apr. 1, 1930 |
| 1,822,313 | Quiggle et al. | Sept. 8, 1931 |
| 1,878,998 | Akins | Sept. 27, 1932 |
| 2,049,071 | McCormick | July 28, 1936 |
| 2,100,150 | Randolph | Nov. 23, 1937 |
| 2,102,780 | Bielfeldt | Dec. 21, 1937 |

FOREIGN PATENTS

| Number | Country | Date |
|---|---|---|
| 330,134 | Germany | Dec. 8, 1920 |
| 333,577 | Germany | Mar. 2, 1921 |